(12) United States Patent  
Hayden

(10) Patent No.: US 7,200,664 B2
(45) Date of Patent: Apr. 3, 2007

(54) DISTRIBUTED NETWORK STORAGE SYSTEM WITH VIRTUALIZATION

(75) Inventor: Mark G. Hayden, Boulder, CO (US)

(73) Assignee: LeftHand Networks, Inc., Boulder, CO (US)

( * ) Notice: Subject to any disclaimer, the term of this patent is extended or adjusted under 35 U.S.C. 154(b) by 366 days.

(21) Appl. No.: 10/708,867

(22) Filed: Mar. 29, 2004

(65) Prior Publication Data

US 2005/0010618 A1    Jan. 13, 2005
US 2005/0144199 A2    Jun. 30, 2005

Related U.S. Application Data

(63) Continuation of application No. 10/063,992, filed on May 31, 2002, now Pat. No. 6,732,171.

(51) Int. Cl.
*G06F 15/173* (2006.01)
*G06F 7/00* (2006.01)
*H04L 9/00* (2006.01)

(52) U.S. Cl. .................... 709/226; 707/104.1; 713/176
(58) Field of Classification Search ................ 709/223, 709/226; 713/176; 707/104.1
See application file for complete search history.

(56) References Cited

U.S. PATENT DOCUMENTS

| 5,537,585 | A | 7/1996 | Blickenstaff et al. ........ 395/600 |
| 6,260,145 | B1* | 7/2001 | Komura et al. ............. 713/176 |
| 6,732,171 | B2* | 5/2004 | Hayden ..................... 709/223 |
| 2001/0020254 | A1 | 9/2001 | Blumenau et al. .......... 709/229 |

* cited by examiner

*Primary Examiner*—Don Wong
*Assistant Examiner*—Patrick A. Darno
(74) *Attorney, Agent, or Firm*—Holland & Hart LLP; Christopher J. Kulish, Esq.

(57) ABSTRACT

The present invention is directed to a data storage system for use in achieving distributed data storage over a computer network. One embodiment of the data storage system comprises a storage server system that is comprised of one or more storage servers that each provide data storage, a management server system that is comprised of one or more management servers that each provide management functionality relating to the storage server system, and a driver that is capable of being associated each of the application clients that are to utilize the data storage system. A data storage configuration identifier structure whose value is updated when there is a change to the composition of the storage system or storage allocation within the storage system is used to manage data transfers between the storage system and application clients.

21 Claims, 9 Drawing Sheets

DISTRIBUTED NETWORK STORAGE SYSTEM WITH VIRTUALIZATION

CROSS REFERENCE TO RELATED APPLICATIONS

This application is a continuation of U.S. patent application Ser. No. 10/063,992, entitled "DISTRIBUTED NETWORK STORAGE SYSTEM WITH VIRTUALIZATION", filed on May 31, 2002 now U.S. Pat. No. 6,732,171.

FIELD OF THE INVENTION

The present invention relates to data storage and, in particular, to the distribution of data storage over a computer network.

BACKGROUND OF THE INVENTION

A conventional networked computer system is comprised of a number of computers that each have an operating system, a network for communicating data between the computers, and at least one data storage device that is attached to at least one of the computers but not directly attached to the network. In such a system, the transfer of data between the data storage device and a computer in the system other than the computer with which the device is associated requires that the operating system of the computer with which the data storage device is associated to devote a certain amount of time to the processing of the data transfer. Because the operating system of the computer is typically servicing requests from various applications (e.g., a word processing application) executing on the computer, the operating system typically is only able to devote a limited amount of time to the processing of the data transfer.

While data transfer rates over networks were relatively slow, the operating systems were typically able to service data transfer requests quickly enough to utilize any available time on the network for data transfers between computers in the system. In other words, the networks, due to their relatively low transfer rates, were the bottleneck in transferring data between a data storage device associated with one computer in the system and other computers in the system. However, as the data transfer rates for network improved, the operating system became the bottleneck because the operating system was typically servicing requests from various applications when the network was available for data transfers to or from the data storage device.

To avoid the operating system bottleneck, data storage devices were developed that directly attached to a network, i.e., network data storage devices. Due to this direct attachment, any computer in a networked computer system is able to directly communicate with the network storage device.

A further advent has been the development of distributed network data storage in which two or more network data storage devices are utilized and a mechanism exists for defining a logical volume, i.e., a unit of data storage that physically extends over the two or more data storage devices. Consequently, to computers in a networked computer system, the logical volume appears to be a single storage device. An example of a network computer system that employs distributed network storage is comprised of: (a) two fibre channel disk drives; (b) a computer; and (c) a network for facilitating data transfers between the drives and the computer. The computer comprises a driver (a program that allows an operating system to communicate with a device) for each of the drives and a logical volume manager that controls the drivers so as to define a logical or virtual volume that extends over the two fibre channel disk drives.

SUMMARY OF THE INVENTION

The present invention is directed to a system for use in achieving distributed network data storage in a network and that provides the flexibility to achieve additional functionality, such as the ability to scale the data storage, stripe data, replicate data, migrate data, snapshot data, and provide shared access.

In one embodiment, the system is comprised of a storage server system that is, in turn, comprised of one or more data storage servers which provide data storage and data transfer capability for application clients in a networked computer system. An application client is a computer in a networked computer system that is or will execute a particular application program (e.g., a data base management program) that requires or will likely require data storage and transfer capability. A data storage server is comprised of a data storage device (e.g., a disk drive) and a network interface for communicating, via a network, with an application client and a management storage server.

The system is further comprised of a management storage server system that is, in turn, comprised of one or more management storage servers which each provide certain storage management functionality relative to any application clients and the storage server system. A management data storage server is comprised of a network interface for communicating, via a network, with an application client and the storage servers in the storage system. A management data storage server is further comprised of a data storage device (e.g., a disk drive or tape drive).

Each of the management storage servers comprises a data storage configuration identifier that is used to coordinate the operation of the storage servers. The value of the identifier is indicative of an allocation of data storage within the storage server system at a particular point in time. In one embodiment, the value is a time stamp. Other types of values are feasible. The allocation of data storage within the storage server system comprises defining any number virtual or logical volumes that are each distributed over one or more of the storage servers. Each of the management storage servers is capable of providing a first value for the identifier to an application client. For example, a management storage server provides a first value for the identifier to an application client as part of the allocation of data storage to the application client. Further, each of the management storage servers is capable of providing an updated value for the identifier to each of the storage servers after there is a change in allocation of data storage within the storage server system.

The storage servers use the identifier in deciding whether or not to carry out a data related request from an application client. To elaborate, a data related request that a storage server receives from an application client comprises the most recent value of the data storage configuration identifier in the application client's possession. The storage server compares the most recent value of the identifier in its possession to the value of the identifier associated with the received request. If the values are the same, both the application client and the storage server understand the data storage allocation to be the same. In this case, the storage server proceeds with the processing of the data related request. If, however, the value of the identifier in the storage servers possession and the value of the identifier associated with the request are different, the application client and the storage server understand the data allocation to be different. Stated differently, the application client is operating based upon an out of date data storage allocation. In this case, the storage server does not proceed with the processing of the request because to do so might corrupt data. In one embodiment, the storage server causes an error to be generated that is provided, via the network, to a management storage server. In response, the management storage server provides the application client with an updated identifier that the application client is then capable of utilizing to retry the data related requested, if desired.

DETAILED DESCRIPTION

Figure 1:
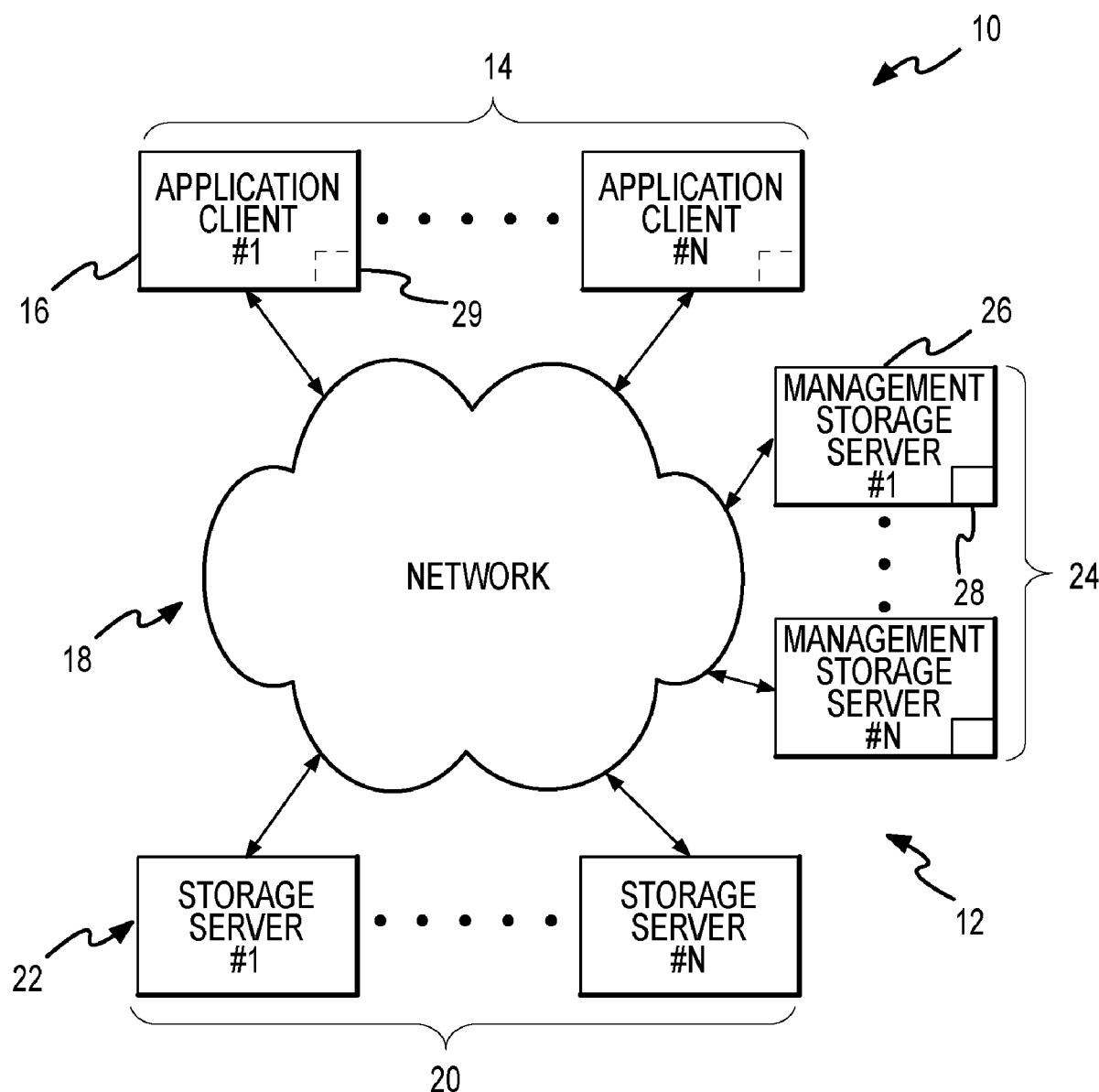
FIG. 1 is a block diagram of a networked computer system that employs an embodiment of the distributed storage system of the present invention.

FIG. 1 illustrates an embodiment of a networked computer system 10 that employs an embodiment of a distributed storage system 12, hereinafter system 12. The networked computer system 10 comprises: (a) an application client system 14 that comprises one or more application clients 16 (i.e., a computer that is or will run an application program); (b) the system 12; and (c) a network 18 for conveying communications between the application clients 16 and the system 12, and between elements of the system 12. In the illustrated embodiment, the network 18 is a Gigabit Ethernet network. However, the invention is applicable or adaptable to other types of networks.

With continuing reference to FIG. 1, the system 12 is comprised of a storage system 20 that provides data storage capability to an application program executing on an application client. The storage system 20 comprises one or more storage servers 22. Each storage server 22 comprises at least one data storage device and at least one interface for communicating with the network 18. In one embodiment, the data storage device is a disk drive. However, other types of data storage devices are feasible. For example, tape drives are feasible. Typically, when the storage server 22 is comprised of multiple data storage devices, the devices are all of the same type (e.g., disk drives). It is, however, feasible to use different types of data storage devices. (e.g., disk drives and tape drives, different types of disk drives, different types of tape drives or combinations thereof).

With continuing reference to FIG. 1, the system 12 is further comprised of a management storage server system 24 that provides management functions relating to data transfers between the application clients and the storage system 20. The management storage server system 24 comprises one or more management storage servers 26. Generally, it is desirable to have multiple management storage servers 26 for fault tolerance. Each management storage server 26 comprises at least one interface for communicating with the network 18 and at least one data storage device (e.g., disk drive or tape drive). In addition, at least one of the management storage servers 26 comprises an interface 28 that allows a user to interact with the server 26 to implement certain functionality relating to data transfers between an application client 16 and the storage system 20. In the illustrated embodiment, the interface 28 is a graphical user interface (GUI) that allows a user to interact with the server 26 via a conventional monitor and keyboard or mouse. Other types of interfaces that communicate with other types of peripherals (e.g., printers, light pens, voice recognition etc.) or network protocols are feasible. It should also be appreciated that a management storage server co-located with a storage server and/or driver.

With continuing reference to FIG. 1, the system 12 further comprises a driver 29 that is associated with each application client 16 and facilitates communications between the application client 16 and the system 12. It should be appreciated that there are alternatives to the use of driver 29. For example, a Peripheral Component Interconnect (PCI) card or Host Bus Adapter (HBA) card can be utilized.

Each of the management storage servers 26 comprises a data storage configuration identifier that relates to a storage configuration map which reflects the composition of the storage system 20 and the allocation of data storage across the storage system 20 to the various application clients 16 at a point in time. The data storage configuration identifier has a value that changes when the composition of the storage system 20 changes or the allocation of storage within the system 20 changes. In one embodiment, the value of the identifier is a logical time stamp that monotonically increases as changes occur. Other types of logical time stamps are possible. For example, logical time stamps with values that decrease are possible, as well as logical time stamps whose values change in a predictable manner. Further, time stamps other than logical time stamps are feasible. For example, a time stamp that reflects actual time is also feasible.

The storage configuration map identifies each of the storage servers 22 in the storage system 20. In addition, the map identifies each logical or virtual volume, i.e., an amount of data storage that is distributed between two of more the storage servers 22 that is allocated to a particular application client 16. Further, the map identifies the partitioning of each logical or virtual volume, i.e., how much data storage of the volume is provided by each of the storage servers 22.

When a management storage server 26 allocates data storage within the storage system 20 to an application client 16, the server 26 provides an updated value for the data storage configuration identifier to the relevant application client 16 and, more particularly, to the driver 29 within the application client 16. The identifier is attached to all requests for data transfers from the storage system 20 by the application client. The management storage server 26 also provides each of the storage servers 22 with the updated value of the identifier. The management storage server 26 may not, however, be able to provide the updated value to other application clients. Consequently, the other application clients may have outdated values for the identifier that reflect an outdated configuration.

The value of the identifier is used by each of the storage servers 22 that receives a request for a data transfer from an application client to prevent corruption of the data. To elaborate, each of the storage servers 22 comprises a comparator that compares the value for the identifier that has been most recently received from the a management storage server 26 to the value of the identifier appended to the data transfer request from an application client. If the values are not equal, then there has been a change in the composition of the storage system 20 or the allocation of storage within the storage server system 20. In this case, since corruption of data could occur or incorrect data could be provided to the application client if the transfer was carried out, the storage server 22 at least ignores the request. In one embodiment, the storage server 22 returns an error message to the relevant application client or a management storage server 26 that is processed so as to provide the relevant application client with an updated value for the identifier. Once the relevant application client has the current value for the identifier, the application client may be able to reinitiate the request for a data transfer or know that it needs to get the new configuration.

If the comparator determines that the value for the identifier that is appended to the request is equal to the value for the identifier that was most recently provided to the storage server by a management storage server, there has been no change in the composition of the storage system 20 or the allocation of storage within the system 20. In this case, the storage server 22 processes the data transfer requested by the relevant application client.

Scaling. The system 12 is capable of readily being scaled to increase or decrease the number of storage servers 22 in the storage system 20. To elaborate, a user is able to use the interface 28 associated with at least one of the management storage servers 26 to propose a modification to the configuration map that involves either the addition of a storage server to the storage system 20 or the subtraction of a storage server 22 from the system 20. If there are other management storage servers 26 in the management storage server system 24, the proposed modification to the configuration is provided to each of the servers 26. Each of the servers 26 is capable of evaluating the impact of the proposed modification and providing a "vote" indicating approval or disapproval of the modification. A management storage server might provide a disapproving vote if the proposed modification would adversely affect the ability to implement certain storage functions. For example, if a management storage server has caused data from an application client to be replicated over two storage servers with a copy on each server, the subtraction of one of the storage servers without the addition of another storage server is likely to be unacceptable. If the proposed change is approved by the management storage servers 26 in the management storage server system 24, the configuration map is changed, any re-allocation of storage within the storage system 20 that is required by the change is implemented, any copying of data within the storage system 20 undertaken, and an updated value for the data storage configuration identifier is issued to each of the storage servers.

Striping. The system 12 is capable of implementing striping, i.e., the partitioning of a logical or virtual volume across two or more storage servers 22. To elaborate, a user is able to use the interface 28 associated with at least one of the management storage servers 26 to propose: (a) a logical or virtual volume within the storage system 20 for an application client; and (b) the partitioning of such a volume between two or more of the storage servers 22 in the storage system 20. The proposed logical volume and proposed partitioning of the volume is provided to each of the management storage servers 26 for assessing the impact thereof and providing an approving or disapproving vote. If the proposed logical volume and partitioning thereof is approved by the management storage servers 26 in the management storage server system 24, the configuration map is changed, any re-allocation of storage within the storage system 20 that is required by the change is implemented, any copying of data within the storage system 20 undertaken, and an updated value for the data storage configuration identifier is issued to each of the storage servers.

Figure 2:
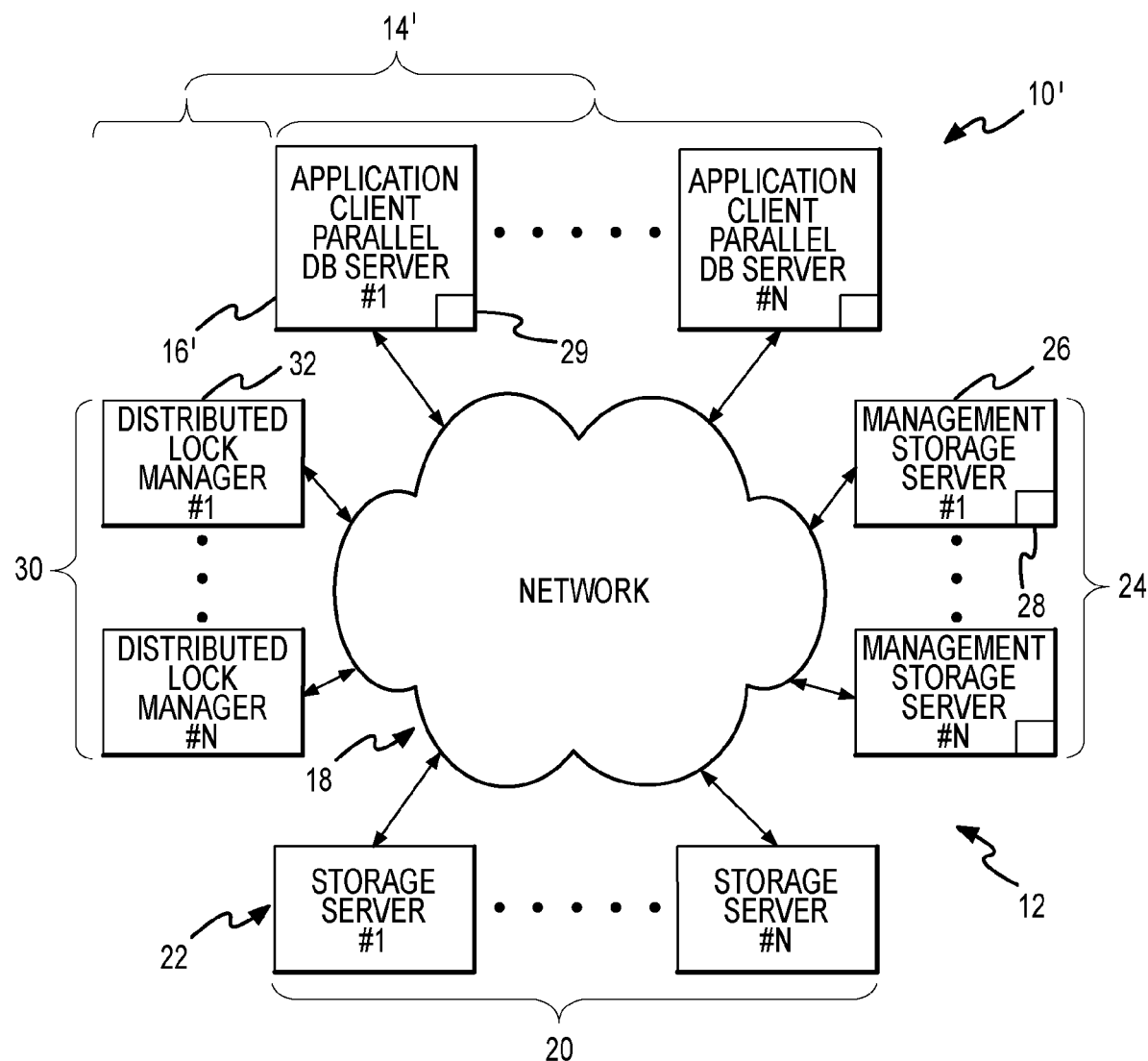
FIG. 2 is a block diagram of a networked computer system in which the application client is a parallel database server and in which an embodiment of the distributed storage system of the present invention is employed.

Shared Access. With reference to FIG. 2, an embodiment of a networked computer system 10' that comprises the distributed storage system 12 and implements shared access is described. The networked computer system 10' further comprises a particular application client system, namely, a parallel database server system 14', such as an ORACLE parallel database server system. The parallel database server system 14' is comprised of two or more parallel database servers 16' that cooperatively operate with one another in the management of a database that is or will be stored in a volume on the storage system 20. The parallel database server system 14' is further comprised of a distributed lock manager system 30 that is, in turn, comprised of one or more distributed lock managers 32 that each operate to issue "locks" to the parallel database servers 16'. A lock relates to a distinct portion of the database that is or will be stored on the volume allocated to the parallel database server system on the storage system 20. The issuance of a lock to one of the parallel database servers 16' provides exclusive write access or shared read access to the portion of the distinct portion of database to which the lock relates relative to the other parallel database servers. By providing exclusive write access to only one of the parallel database servers 16', the situation in which two of the servers are concurrently updating the same portion of the database is prevented.

It should be appreciated that, while the distributed lock managers 30 are illustrated as being separate from the parallel database servers 16', the distributed lock managers 30 are implemented, in one embodiment, such that each of the distributed lock managers 30 is associated with one of the parallel database servers 16'. In such an embodiment, each of the distributed lock managers 30 has access to the driver 29 (via a generic interface associated with the parallel database management program) that facilitates communication with the distributed storage system 12. Other implementations of the distributed lock managers 30 are feasible, provided each of the lock managers has the ability to communicate with at least one of the management storage servers 26.

Each of the distributed lock managers 30 operates so as to monitor the parallel database server to which a lock has been issued to determine if the lock can be returned so that the lock can be issued to another one of the parallel database servers 16'. In certain situations, a distributed lock manager 30 operates to revoke a lock issued to a first of the parallel database servers 16. For example, if a distributed lock manager 30 determines that the communication link with the first parallel database server to which a lock has been issued is no longer active or available or that the first parallel database server has failed, the distributed lock manager 30 revokes the lock issued to the first parallel database server. In such a situation, the distributed lock manager 30 can reissue the lock to a second parallel database servers.

A problem with the lock being issued to the second parallel database server is that the first parallel database server, while in possession of the lock, may have initiated a write request to the volume on the storage system 20 that has not been processed by the storage system 20 by the time the lock has been revoked and issued to the second parallel database server. This situation occurs if, for example, the write request is still traversing the network during the period of time when the lock is being revoked and reissued to the second parallel database server. In this case, the possibility exists that the first and second parallel database servers could concurrently be updating the same portion of the volume of the database, a situation that is undesirable.

To address this problem, one of the distributed lock managers 32 communicates, via its driver 29, with one of the management storage servers 26 that a lock is being revoked. In response, the management storage server updates a "lock" map. Updating of the "lock" map causes the value of the data storage configuration identifier to be updated. After the value of the identifier has been updated, the management storage server provides the updated value for the data storage configuration identifier to each of the storage servers 22 in the storage system 20. Subsequently, the management storage server issues a communication to the distributed lock manager that authorizes the lock manager to reissue the lock.

Providing an updated value for the data storage configuration identifier to the storage server 22 prevents the write request that was initiated by the first parallel database server from being processed the storage server. To elaborate, associated with the write request is a particular value for the data storage configuration identifier that was previously provided to the parallel database server by one of the management storage servers 26. However, due to the updating of the data storage configuration identifier, the storage servers 22 have an updated value for the data storage configuration identifier that is different from the value for the identifier associated with the write request. Consequently, if one of the storage server 22 receives the write update, the comparator in the storage server detects the difference in the values of the data storage configuration identifiers and, due to the difference, at least ignores the request for the write update.

Replication. A user is able to use the interface 28 associated with at least one of the management storage servers 26 to cause data from an application client to be replicated on the volume of the storage system 20 dedicated to the application client such that one copy of the data resides on one of the storage servers 22 and one or more other copies of the data each reside on one of the other storage servers 22. This redundancy provides fault tolerance. The user indicates that data is to be replicated by appropriately modifying the configuration map via the interface 28. Updating the configuration map causes the value of the data storage configuration identifier to be updated. The updated value for the data storage configuration identifier is provided to each of the storage servers 22 and the driver 29 of the application client to which the replication is relevant. The driver 29 is also provided with configuration map or other information that defines the replication that is to be applied to the application client data, e.g., the relevant volume and the storage servers on which the copies of the data are to reside.

A problem with replicating data is that the copies of the data can become de-synchronized, i.e., the copies are no longer identical to one another. For example, copies of data become de-synchronized when a first copy of the data is updated on one of the storage servers 22 but one of the other storage servers 22 that is to have a second copy of the data fails before the update occurs on the server.

Figure 3A:
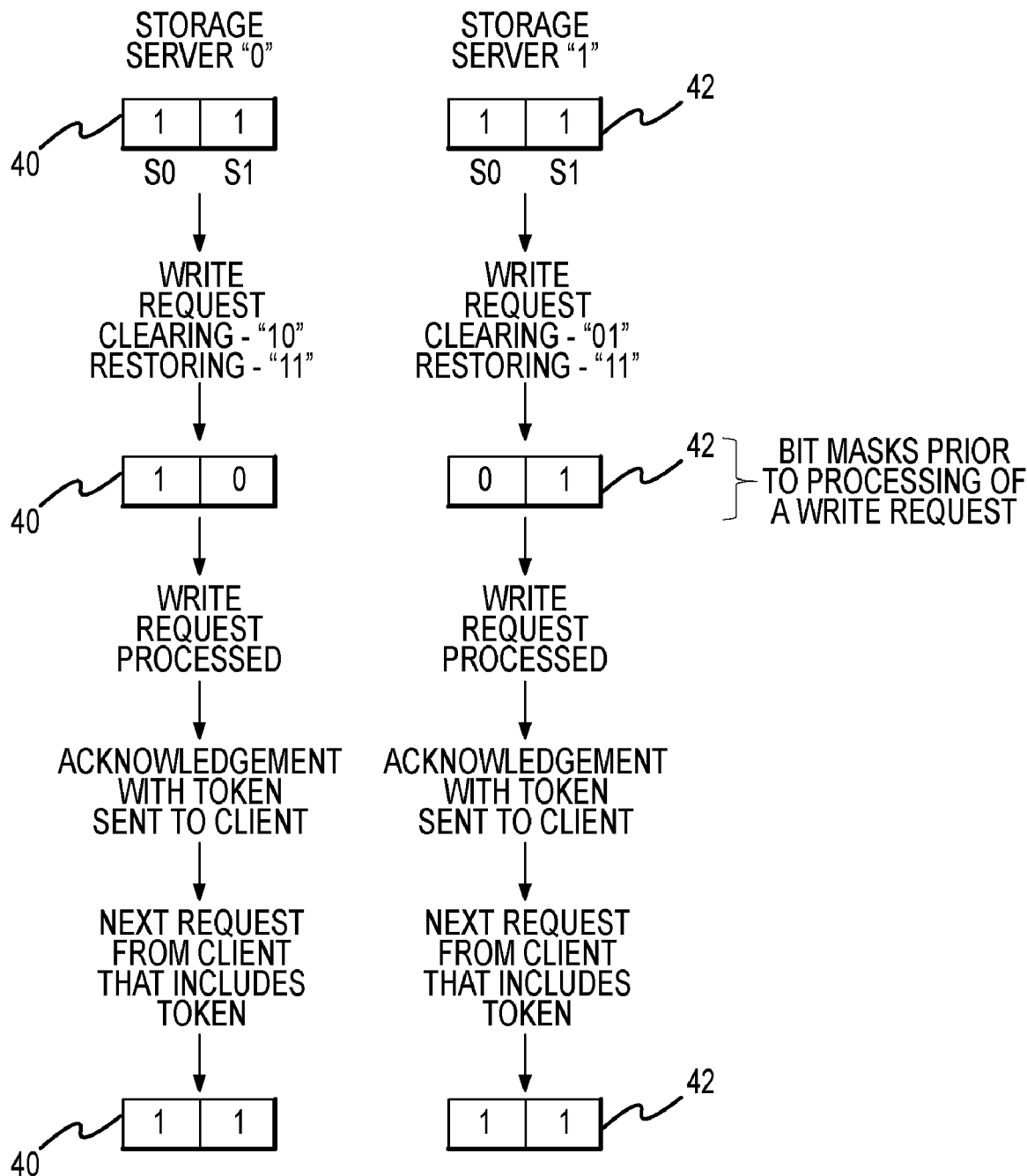
FIG. 3A illustrates the use of bit masks in verify that a page of data on one storage server is synchronized with a copy of a page of data on another storage server when data is being replicated.

This problem is addressed using a bit mask device (also referred to as synchronization bits) in the storage servers on which data is to be replicated that is, on occasion, interrogated by a management storage server and used by the management storage server to determine if copies have become de-synchronized and take remedial action. With reference to FIG. 3A, the operation of the bit mask device is illustrated for the situation in which copies of a page of data are to be replicated on server "0" and server "1". A page of data is a unit of allocation for the storage system 20, typically on the order of a megabyte in size, but other sizes are feasible. Associated with server "0" is a two bit, bit mask 40 with the first bit of the mask relating to server "0" and the second bit relating to server "1". Associated with server "1" is a two bit, bit mask 42 with a first bit of the mask relating to server "0" and the second bit relating to server "1". When the copies of a page of data on both of the servers are synchronized, the value of each of the bits in both bit masks is a logical "1", which is also referred to as a "clean" condition. Whenever the value of each of the bits in both bit maps is not "1", then the possibility exists that the copies are de-synchronized. A copy of a page of data is always deemed to be synchronized with itself. Consequently, bit "S0" of the mask 40 is always set to a logical 1 and bit "S1" of the mask 42 is always set to a logical 1.

When the driver 29 associated with the application client whose data is to be replicated issues a write request to server "0", the write request includes clearing bit mask values and restoring bit mask values. The clearing bit mask values are the values to which the bits of the bit mask 40 are to be set prior to the processing of the write request by server "0". The restoring bit mask values are the values to which the bits of the bit mask 40 are to be set after it is confirmed that the write request was processed. The clearing bit mask values are used to update bit mask 40 prior to processing the write request for server "0". Once the write request for server "0" has been processed by server "0", the server issues an acknowledgment with a token to the client application.

Similarly, the write request issued by the driver 29 to server "1" includes clearing bit mask values and restoring bit mask values. The clearing bit mask values are used to update bit mask 42 prior to processing the write request for server "1". Once the write request for server "1" has been processed by server "1", the server issues an acknowledgment with the token to the client application.

Once the driver 29 receives acknowledgments from both server "0" and server "1", the driver 29 includes the token in the next commands issued to each of the storage servers on which data is being replicated. Typically, the next commands are write requests issued to both server "0" and server "1" to replicate data. The storage server "0" responds to its command by changing the value of the bits in the bit mask 40 to the restoring values, i.e., "11". The storage server "1" respond to its command by changing the value of the bits in bit mask 42 to the restoring values, i.e., "11". At this point, the value of each of the bits in each of the bit masks 40, 42 is the same, namely, logical "1". Consequently, the copies of the page of data on server "0" and server "1" are synchronized, i.e., identical to one another.

Figure 3B:
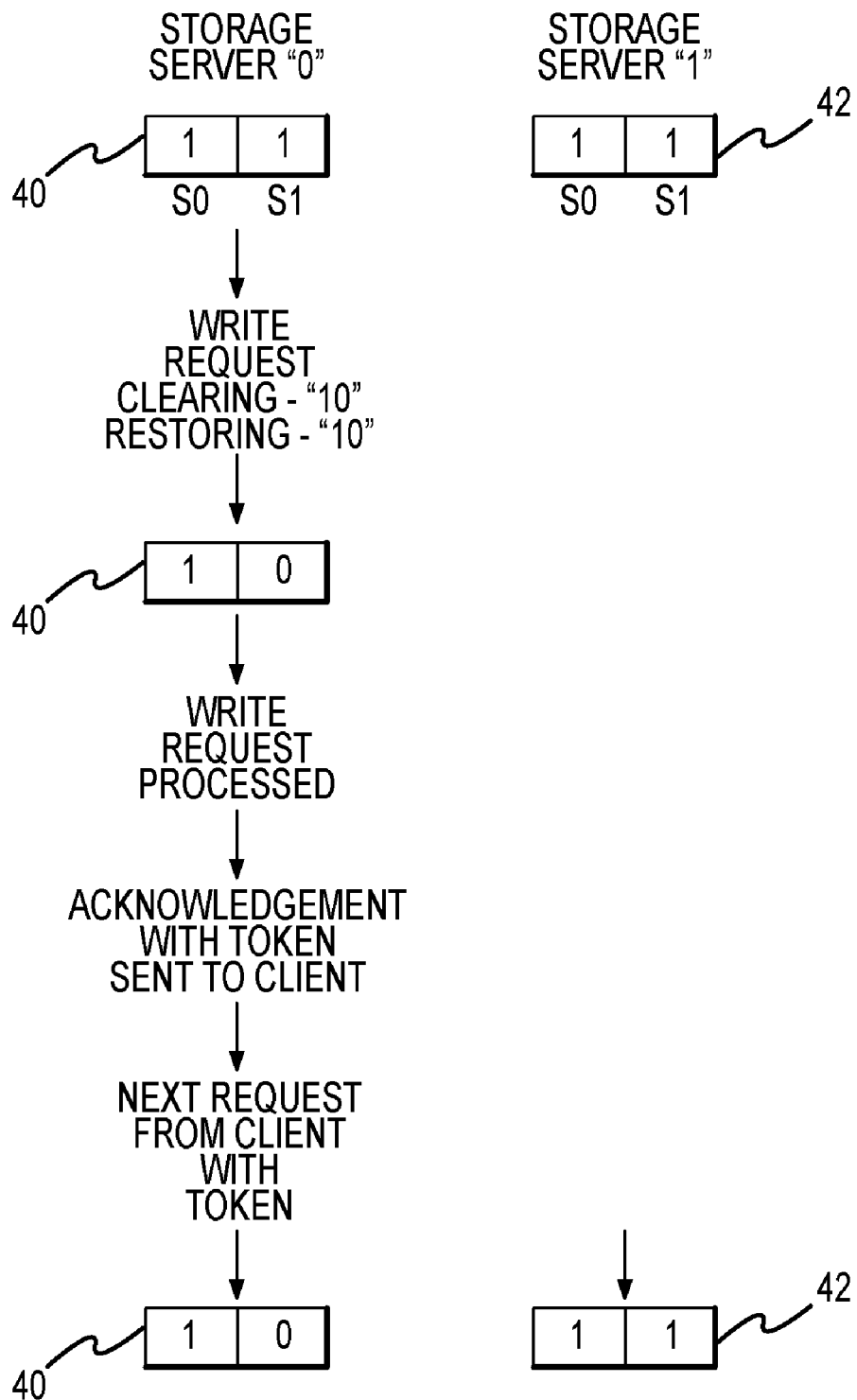
FIG. 3B illustrates the use of bit masks to indicate that a page of data on one storage server is desynchronized with a copy of a page of data on another storage server when data is being replicated.

With reference to FIG. 3B, a situation in which the bit masks 40, 42 are used to identify a situation in which the two copies of the page of data have become de-synchronized is described. The reason for the de-synchronization is that server "1" has been deemed to have failed (i.e., become unable to process requests or commands) prior to a write request from the client application being issued. As a consequence, when the application attempts to replicate the page of data on servers "0" and "1" only the data on server "0" is updated. Consequently, when server "1" is brought back on line, the copy of the page of data on server "1" will be "old" relative to the copy of the page of data on server "0".

With continuing reference to FIG. 3B, the copies of the page of data on servers "0" and "1" are initially assumed to be in synchronization. As a consequence, the value of each of the bits in bit masks 40, 42 is the same, namely, a logical "1". Prior to write requests being issued to servers "0" and "1" to implement a replication operation, one of the management storage servers 26 deems server "1" to have failed. At least one of the management storage servers 26 issues a request to at least one of the storage servers 22 on occasion to determine if the storage server is operational. If the server is operational, the storage server will cause some form of reply or acknowledgment to be sent to the management storage server that issued the request within a predetermined amount of time. If a reply or acknowledgment is not received within the predetermined amount of time, the management storage server assumes that the storage server has failed. In such a situation, the management storage server updates the configuration map, updates the value of the data storage configuration map identifier, and provides the map and identifier to the application client, as well as the storage servers 22. Since the application client is aware that server "1" has failed, no write request is issued to storage server "1". The write request issued to server "0" includes clearing bit values and restoring bit values. However, due to the change in the storage system 20 caused by the failure of server "1" and reflected in the change in the data storage configuration identifier, the restoring bit values are, unlike in FIG. 3A, set to "10".

Server "0", after receiving the write request but before processing the write requests, sets the values of the bits in bit mask 40 to the clearing bit values, namely, logical "10". The server then processes the write request and sends an acknowledgment to the application client that includes a token. The next command received by server "0" from the application includes the token. In response, server "0" modifies the bits of the bit mask 40 to the restoring values specified in the restoring bit values that accompanied the write request, namely, logical "10". At this point, since the value of each of the bits in bit masks 40, 42 is incapable of being the same value (since bit mask 40 is set to "10") the bit masks reflect a de-synchronization state. At least one of the management storage servers 26 is monitoring the bit masks and detects the indication of the copies of the page of data being de-synchronized. After the management storage server detects this condition, the management storage server typically causes remedial action to be taken. In this case, the management storage server cause the copy of the page of data on server "0" to be written to server "1", thereby bringing the copies of the data back into synchronization. It should be appreciated that the bit masks are capable of being used to detect de-synchronization that is attributable to other causes.

The bit mask device described with respect to FIGS. 3A and 3B is capable of being extended to accommodate a greater number of copies. Further, it should be appreciated that opposite bit values from those described with respect to FIGS. 3A and 3B can be utilized.

Migration. A user is able to use the interface 28 associated with at least one of the management storage servers 26 to cause data on one logical volume to be migrated to another logical volume. This is accomplished using a "translucent" layering mechanism. To elaborate, after the user initiates or defines the migration of data that is to occur, the management storage server saves the portion of the data storage configuration map that relates to the volume whose data that is to be migrated (the old volume), identifies this portion of the map as a layer, and orders this layer as a first or old layer. The data storage configuration map is then updated to reflect the new data storage configuration and, in particular, to identify the logical volume to which the data is migrated (the new volume). This causes the value of the data storage configuration identifier to be updated. The new map and value for the identifier are distributed to the storage servers 22 and to the driver 29 in the relevant application client. In addition, the portion of the configuration map that relates to the new volume to which the data is to be migrated is identified as a layer and this layer is ordered as a second or new layer.

After the layering is defined and ordered, data is migrated from the old volume to the new volume by two possible mechanisms. First, at least one of the management storage servers 26 actively monitors each of the pages in the first or old layer to determine if the data associated with each of the pages in the old volume has not been migrated to the new volume. If a page is found whose data has not been migrated to the new volume, the management storage server causes the data from the page on the old volume to be read, the data to then be written to the new volume, and the page in the old volume to be marked as "deleted". The second mechanism for migrating data from the old volume to the new volume occurs when an application client endeavors to write to a page on the new volume. In this situation, the driver 29 interrogates the new layer before issuing the write request relating to the page to determine if the page in the new layer has received the data from the corresponding page in the old volume. If not, the driver 29 is able to "see through" the "transparent" portion of the new layer that relates to the page to which data is to be written to the old layer and "see" that the data has not yet been migrated from the old volume for the corresponding page. In this case, driver 29 causes the data from the page on the old volume to be read, the data to then be written to the new volume, and the page in the old volume to be marked as "deleted". Further, after data from the page on the old volume has been migrated to the new volume, the driver 29 issues the write request that then causes data to be written to the page on the new volume.

By marking each page of the old volume as deleted after the data from the page has been migrated, a mechanism is provided for preventing a situation that could adversely affect the migration. To elaborate, it is possible for two client applications to be attempting to write to a page in the new volume during the same period of time and when data for the page has not yet been migrated from the old volume. In this situation, the driver 29 associated with each application client endeavors to cause the migration of data from the page on the old volume to the corresponding page on the new volume. The driver 29 associated with one of the application clients will be successful in causing the data for the page to be migrated and may then cause the data on the page on the new volume to be updated via a write request. The driver 29 associated with the other application client, without the noted marking, would not be aware that the data for the page has been migrated and endeavor to migrate the data to the corresponding page on the new volume. If this were to happen, the data migrated by the other application client could overwrite the new data established in the page by the write request issued by the application client that initially caused the data to be migrated. To avoid this possibility, the driver 29 checks the relevant page in the old layer to determine if the data for the page has already been migrated, before taking any action to migrate the data. If the data for the page has been migrated, then the driver 29 aborts the current write request and retries the write request.

After the data from each page of the old volume has been migrated to the new volume, the old layer is deleted.

Figure 4A:
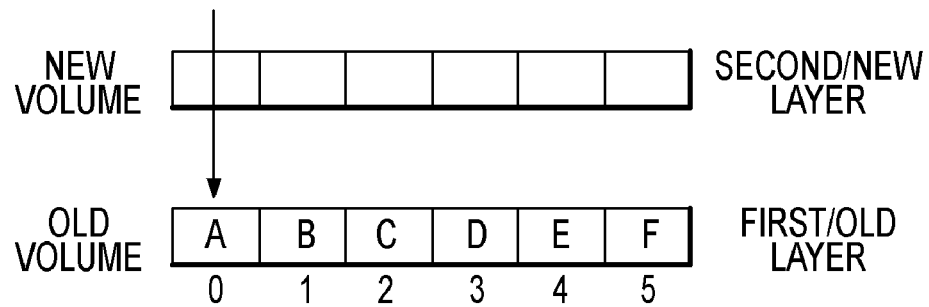
FIGS. 4A–4C illustrate an example of the use of a layering mechanism to migrate data from pages on one volume to pages on another volume.
Figure 4B:
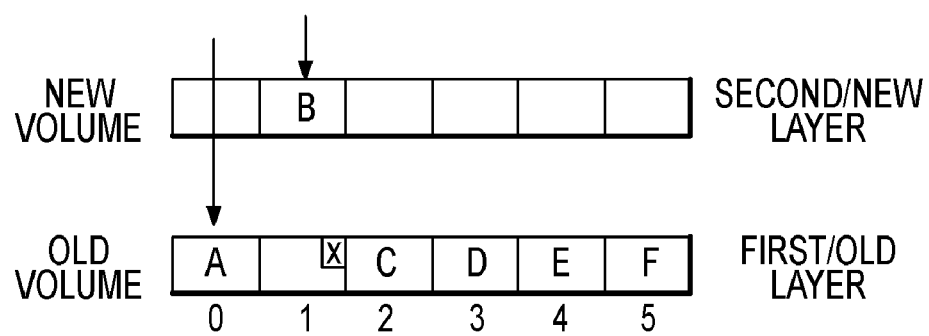
Figure 4C:
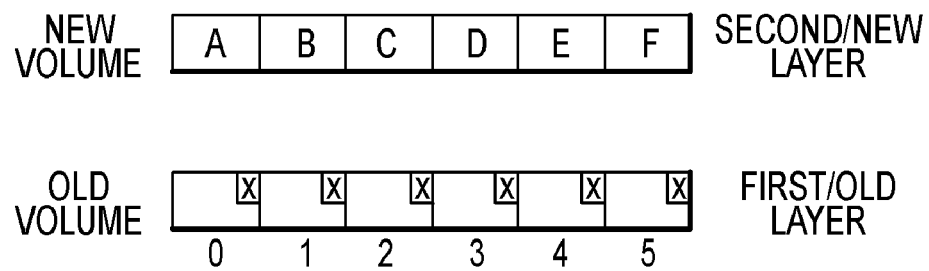

With reference to FIGS. 4A–4C, an example of migration is described. FIG. 4A illustrates an old volume comprised of six pages (0–5) and with data (A–F) in each of the pages and a new volume before the migration of any data from the old volume to the new volume. To effect the migration, the old volume is further identified as a layer and ordered as the first or old layer. Because data is present in each of the pages of the old volume at this point, there is no "transparency" associated with the old layer. The new volume is also identified as a layer and ordered as the second or new layer. Because no data is present in any of the pages of the new volume at this point, there is "transparency" associated with each page in the new layer. This "transparency" allows the driver associated with an application client to "see" that the data for the page is present in the first or old layer.

FIG. 4B illustrates the old volume and the new volume after the data (B) in page "1" of the old volume has been migrated to page "1" in the new volume. At this point, there is no longer any "transparency" associated with page "1" of the new layer, which indicates that the data from page "1" in the old volume has been migrated to page "1" in the new volume. There is still "transparency" associated with the other pages of the new layer, which means that the data from the corresponding pages in the old layer has not yet been migrated. It should also be noted that page "1" in the old layer, due to the migration, is now marked as deleted, which is represented by an "X".

FIG. 4C illustrates the old volume and the new volume after the data for each page of the old volume has been migrated to the corresponding page in the new volume. At this point, there is no longer any "transparency" associated with the new layer, which indicates that data from all of the pages in the old volume has been migrated to the new volume. Further, each of the pages in the old layer, due to the completed migration, is now marked as deleted. As a consequence, the old layer is no longer required and can be deleted.

It should be appreciated that the translucent layering mechanism is capable of being extended to multiple migrations that would require additional layers.

Snapshot. A snapshot preserves the state of a volume at a particular point in time while also causing the data in the pages of the preserved volume, the snapshot volume, to be migrated to a new volume where the pages can be updated by one of more of the application clients. To preserve the state of the snapshot volume, the new volume cannot overlap with the snapshot volume.

A user is able to use the interface 28 associated with at least one of the management storage servers 26 to cause a snapshot. Once a snapshot has been initiated, the management storage server 26 establishes the same translucent layering mechanism described with respect to the migration process to facilitate migration of the data from the snapshot volume to the new volume. Migration is achieved by the migration of data in a page as a prelude to the issuance of a write request from the driver 29 associated with an application. However, in contrast to the migration process, after data for a page is migrated from the snapshot volume to the new volume, the page on the snapshot volume is not marked as deleted. Consequently, the data in the pages of the snapshot volume are preserved.

Figure 5A:
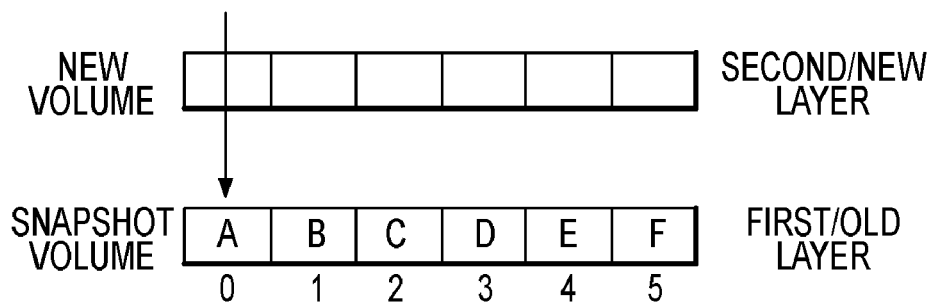
FIGS. 5A–5C illustrate an example of the use of a layering mechanism to implement a snapshot operation.
Figure 5B:
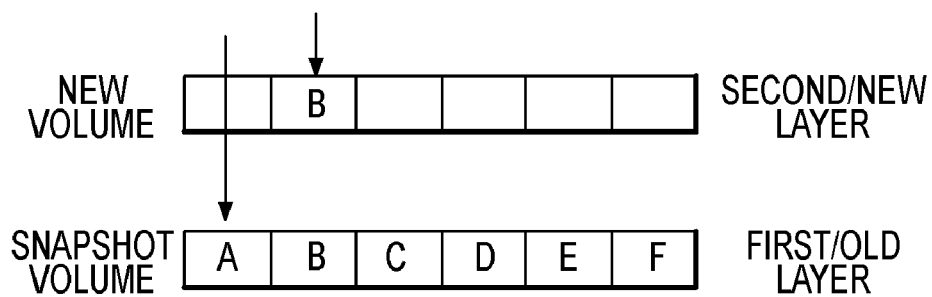
Figure 5C:
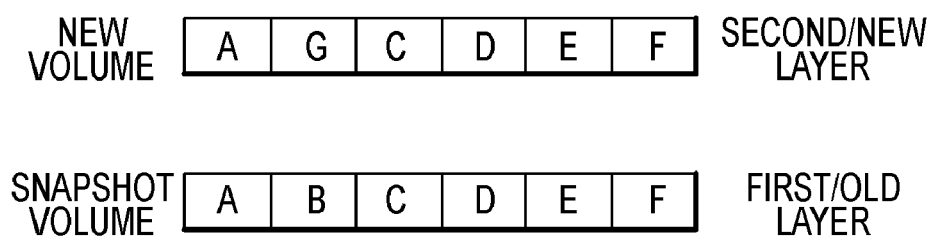

With reference to FIGS. 5A–5C, an example of snapshot is described. FIG. 5A illustrates a snapshot volume comprised of six pages (0–5) and with data (A–F) in each of the pages and a new volume before the migration of any data from the snapshot volume to the new volume. To effect the migration, the snapshot volume is further identified as a layer and ordered as the first or old layer. Because data is present in each of the pages of the snapshot volume at this point, there is no "transparency" associated with the old layer. The new volume is also identified as a layer and ordered as the second or new layer. Because no data is present in any of the pages of the new volume at this point, there is "transparency" associated with each page in the new layer. This "transparency" allows the driver associated with an application client to "see" that the data for the page is present in the first or old layer.

FIG. 5B illustrates the snapshot volume and the new volume after the data (B) in page "1" of the snapshot volume has been migrated to page "1" in the new volume. At this point, there is no longer any "transparency" associated with page "1" of the new layer, which indicates that the data from page "1" in the snapshot volume has been migrated to page "1" in the new volume. There is still "transparency" associated with the other pages of the new layer, which means that the data from the corresponding pages in the snapshot layer has not yet been migrated. It should also be noted that the data that was in page "1" in the snapshot volume before the migration is still in page "1" of the snapshot volume and cannot be altered. The data that has been migrated to page "1" of the new volume is, however, susceptible to modification.

FIG. 5C illustrates the snapshot volume and the new volume after the data for each page of the snapshot volume has been migrated to the corresponding page in the new volume. At this point, there is no longer any "transparency" associated with the new layer, which indicates that data from all of the pages in the old volume has been migrated to the new volume. Further, it should be noted that the data in each of the pages of the snapshot volume before the migration operation is still present and in the same location after completion of the migration. Hence, the snapshot has preserved the state of the initial volume at a particular point in time. The data in each of the pages of the snapshot volume has also been migrated to the new volume and the pages of the new volume are susceptible to modification as a result of the processing of write requests issued by an application client.

Figure 6:
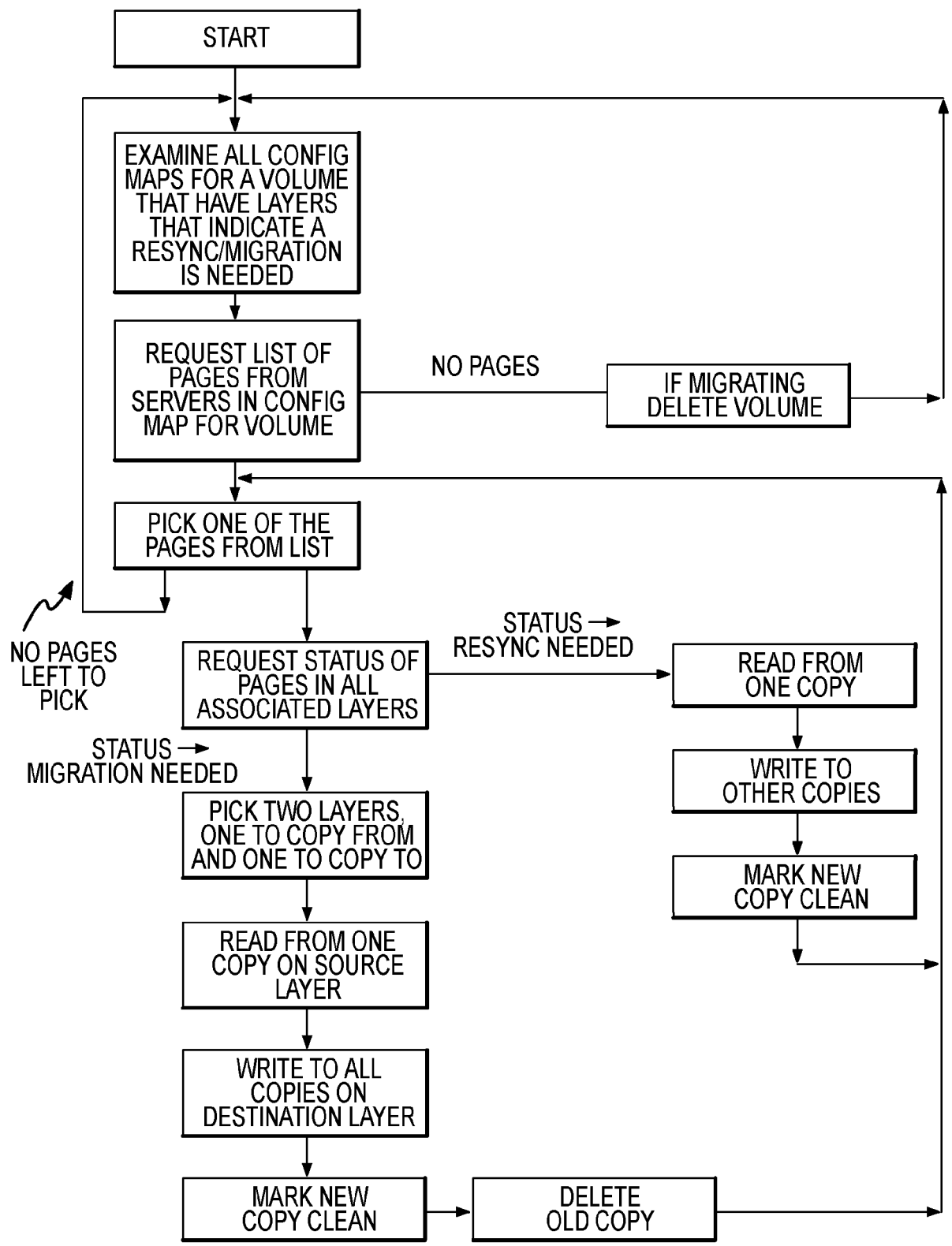
FIG. 6 illustrates an embodiment of a process implemented by the management storage server to manage the storage server system.

Management Storage Server Process. With reference to FIG. 6, the management storage servers each carry out a process that has two primary tasks: resynchronization of data after a storage server failure or restart, and the migration of a volume of data. The process has two phases. The first phase involves locating the volumes and pages within the volumes that need to be either resynchronized or migrated. The management storage server begins by examining its set of configuration maps for the volumes currently being managed. From this, the server determines which volumes may require some work because the volume is in the process of being migrated to a different set of storage servers or because at least one of the storage servers storing data for the volume had failed and then restarted but had not yet been fully resynchronized. After determining the set of volumes requiring work, the management storage server then picks one of them, either randomly or according to some priority. The management storage server then requests that each of the storage servers enumerate up to some fixed number of pages that match the migration or resynchronization criteria. The pages are accumulated by the management storage server with duplicates being discarded. The management then proceeds through the pages, either one-by-one or potentially several in parallel, for the second phase of the process.

For each page, the management storage server first requests the status of all copies of the page in all the layers associated with the volume from the associated storage servers. If any of the copies of the page in any of the layers has synchronization bits that indicate the different copies could contain different data, then these layers of the page are selected to be resynchronized. They are resynchronized as follows. The management storage server picks a copy of the page on one server which is referred to as the "authoritative copy" and reads the contents of that copy. The management storage servers must pick the authoritative copy in such a way that they all pick the same copy as authoritative. One way to do this is to base the selection on information in the configuration map, but other methods are feasible. After reading the authoritative copy, the management storage server then writes the contents of the page to the other copies of the page in that layer. The management storage server then marks all copies of the page as being clean by setting their synchronization bits. The management storage server is now done with the page for the time being (it is possible there is still some additional work to be done on the page, but in that case the storage servers will enumerate the page again).

If no copies of a page need to be resynchronized but there is a copy that needs to be migrated, then the management storage server follows these steps. First, the management storage server determines which layer will be the source layer and which layer will be the destination layer. The management storage server then reads one copy from the source layer. The management storage server writes that data to all copies of the destination layer. The management storage server then marks all the copies on the destination layer clean by setting their synchronization bits. Finally, the management storage server requests that all copies on the source layer be deleted. At this point, the management storage server is done migrating the page.

Throughout each step of this process, it is possible that a storage server will generate an error indicating that the management storage server is using a value for the data storage configuration identifier that is out-of-date. If this happens, the management storage server then restarts the process. The management storage server also restarts the process if any communication errors occur during the process or any aspect of the configuration map for the volume changes.

Figure 7A:
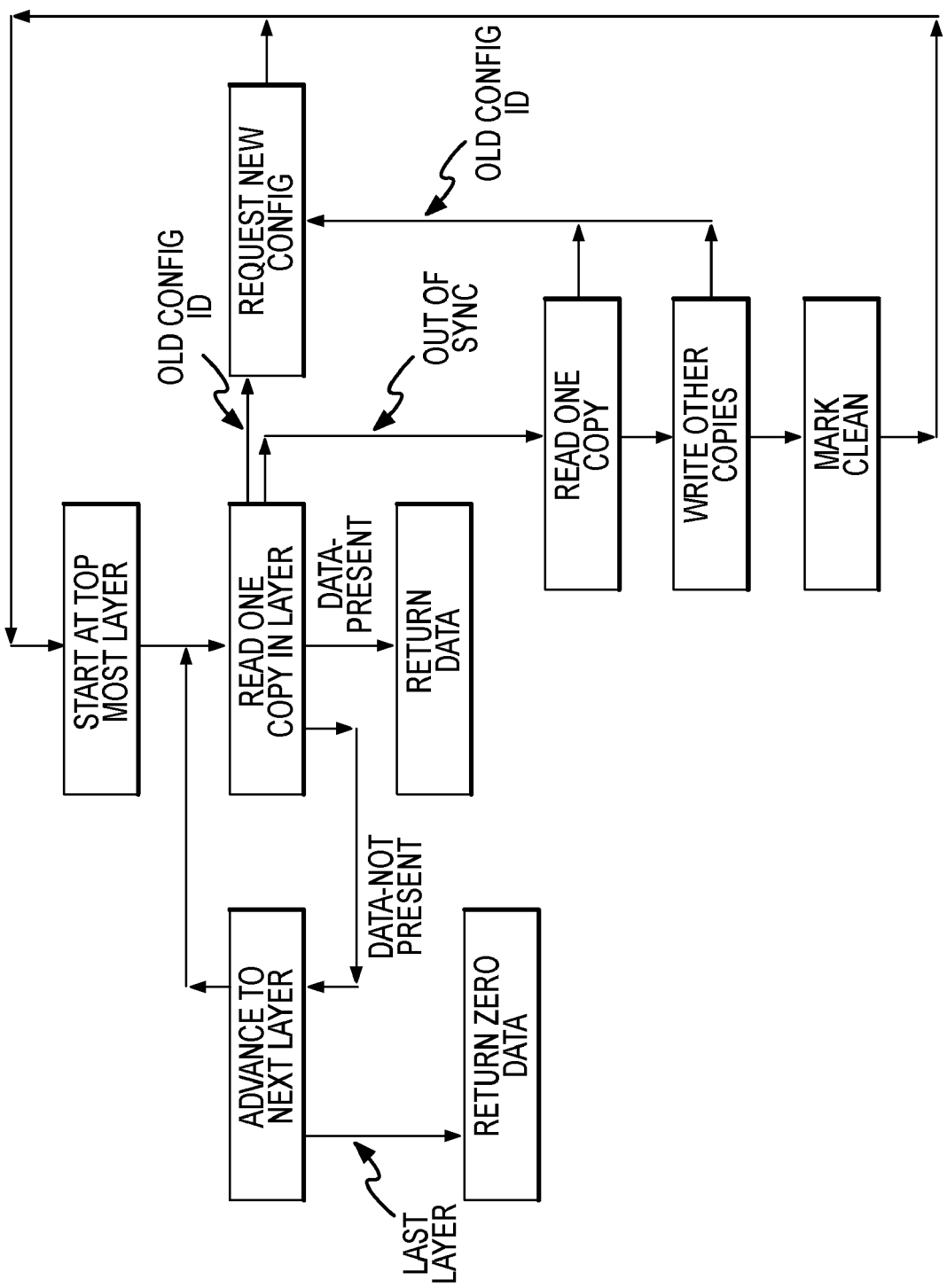
FIG. 7A illustrates an embodiment of a process implemented by the driver associated with an application client to perform a read operation.

Client Driver Read Process. With reference to FIG. 7A, the driver 29 implements a process to read a portion of a page of data for a volume. This process is only initiated after the driver has received a copy of the current configuration map and a value for the data storage configuration identifier from a management storage server for the volume that the driver is accessing. The driver starts at the top-most layer and picks one copy of the page in that layer to read from. The driver may pick the copy to read in any way; including randomly or according to a performance load metric (trying to pick the least loaded storage server). If the data exists in that layer, then the driver returns the data it read to the operating system. Otherwise, the driver advances layer by layer, attempting to read the page's data in each layer. If the driver gets to the last layer without locating any valid copies, then the driver returns data to the operating system as though the data were there but were all zeroes ("0"). If any copy is found to be potentially unsynchronized because of the status of the synchronization bits, then the driver will resynchronize that data by reading an "authoritative copy", writing to all other copies in the layer, setting the synchronization bits to all-ones ("1") and then restarting the process. If at any time, a storage server indicates in a reply to a request that the configuration value for the data storage configuration identifier the driver used is old, then the driver requests a new configuration map from a management storage server and restarts the process. The process also restarts if the management storage server sends the driver a new configuration map, if the driver encounters a page that was marked as having previously existed but has since been deleted, or if there are any communication errors.

Figure 7B:
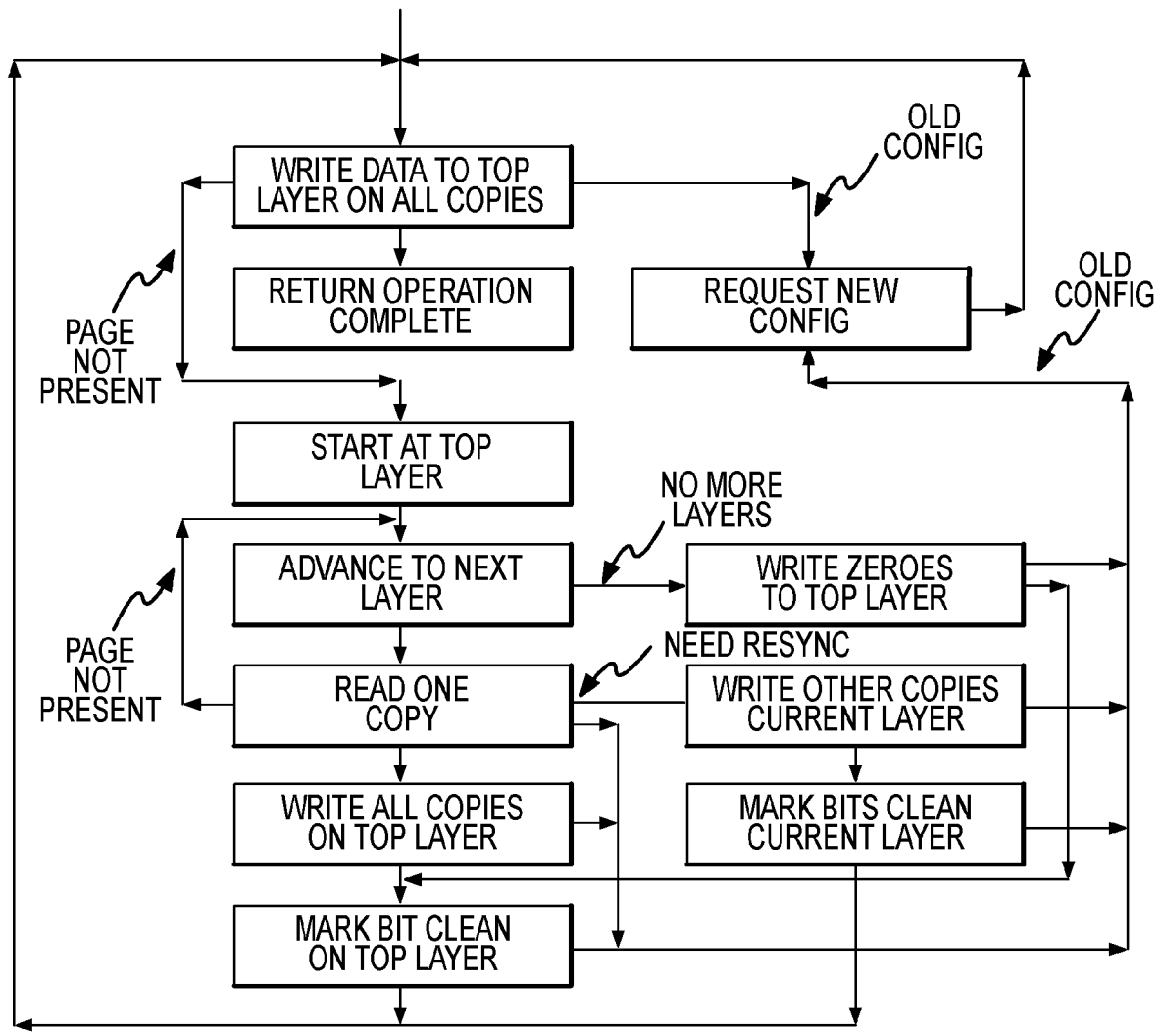
FIG. 7B illustrates an embodiment of a process implemented by the driver associated with an application client to perform a write operation.

Driver Write Process. With reference to FIG. 7B, the driver 29 implements a process to write data to a portion of a page in a volume. This process is only initiated after the driver has received its first configuration map and data storage configuration identifier from a management storage server.

The process begins by writing the data to all copies of the page in the top-most or most recent layer. If all writes succeed, then the driver returns the successful completion to the operating system. If any copy is not present in the top-most layer, then the driver proceeds to scan down the layers looking for the uppermost copy of the data in all the layers. If the data is not synchronized, the driver resynchronizes the data (using the same steps as in the read process above). If the page is not present in any layers, then zeroes are written to all copies of the top-most layer, the synchronization bits in all copies are set, and the process restarts. Otherwise, one copy of the data in the uppermost layer is selected, the driver reads the entire page, writes the driver to all copies in the top-most layer, sets the synchronization bits in the top-most layer, and then restarts this process.

As in the other processes, if on any request a storage server replies that the driver's configuration ID is old, then the client driver requests a new configuration map and data storage configuration identifier from a management storage server and restarts the process. The process also restarts if the management storage server sends the driver a new configuration map, if the driver encounters a page that was marked as having previously existed but has since been deleted, or if there are any communication errors.

The invention claimed is:

1. A system for use in achieving distributed data storage over a computer network comprising:
   a storage server system comprising one or more storage servers that each comprise a data storage device and a network interface for communicating with one or more application clients that will require data storage and at least one management storage server; and
   a management server system comprising one or more management storage servers that each comprise a network interface for communicating with an application client and each of said storage servers;

each of said management servers and each of said data storage servers comprising a data storage configuration identifier whose value is indicative of an allocation of data storage within said storage server system at a point in time, the allocation of data storage within said storage server system comprising one or more virtual volumes of data storage distributed over one or more of said storage servers;

wherein each of said management storage servers is capable of providing a first value for said data storage configuration identifier to an application client and each of said storage servers, and each of said management storage servers is capable of asynchronously providing a second value for said data storage configuration identifier to the application client and to each of said storage servers after there is a change in the allocation of data storage within said storage server system; and wherein each of said storage servers is capable of: (a) comparing a value for said data storage configuration identifier which is associated with a data storage related request received from an application client with said second value for said data storage configuration, and (b) when the values are not equal, providing an indication to a management storage server that the values are not equal.

2. The system, as claimed in claim 1, wherein said management storage server is capable of providing an updated data storage configuration an data storage configuration identifier to said storage server when an indication is provided that the values are not equal.

3. The system, as claimed in claim 1, wherein each of said storage servers is further capable of reporting an error back to the application client when the values are not equal.

4. The system, as claimed in claim 3, wherein each of said storage servers is further capable of receiving an updated allocation of data storage within said data storage server system from a management storage server, evaluating said updated allocation to determine if data integrity within the data storage server will be adversely affected by the updated allocation, and return a vote to said management storage server approving of the allocation change when the data integrity is not adversely affected.

5. The system, as claimed in claim 4, wherein when the updated allocation is approved, each of said storage servers is further capable of determining if data stored at the respective storage servers is required to be moved as a result of the updated allocation and moving the data that is to be moved as a result of the updated allocation.

6. The system, as claimed in claim 1, wherein the allocation of data stored at said storage servers is not synchronized between one or more storage servers for an indeterminate period of time.

7. The system, as claimed in claim 1, further comprising a driver for associating with an operating system of an application client, wherein said driver comprises a configuration map that is capable of identifying one or more of said storage servers containing data to be accessed by the application client.

8. The system, as claimed in claim 7, wherein said allocation of data within said data storage system includes providing data stored at one or more of said storage servers be replicated to one or more other of said storage servers.

9. The system, as claimed in claim 8, wherein said driver is capable of initiating a read process to read data from said storage server system and determining based on said configuration map a source storage server to read said data from.

10. The system, as claimed in claim 9, wherein said data is stored on two or more storage servers and said driver selects said source storage server based on a performance load metric.

11. The system, as claimed in claim 8, wherein at least a first storage server has a failure and said driver is capable of determining other storage servers that are available to service data storage related requests from an application client.

12. The system, as claimed in claim 11, wherein when said failed first storage server recovers from said failure, said first storage server is operable to determine data that needs to be moved to and from said first server in order to recover from said failure.

13. The system, as claimed in claim 8, wherein said storage servers are further operable to perform copying of data between servers asynchronously.

14. The system, as claimed in claim 13, wherein said storage servers are further operable to perform copying from one storage server to multiple other data storage servers.

15. The system, as claimed in claim 8, wherein said storage server system is operable to perform data movement between data storage servers while continuing to receive and respond to data storage related requests received from application clients.

16. The system, as claimed in claim 15, wherein said data movement comprises generating a snapshot of data stored at a first virtual volume stored across at least a first storage server and copying said snapshot to at least a third storage server.

17. The system, as claimed in claim 16, wherein said snapshot is generated by designating data stored at said first storage server as snapshot data, and performing read and write operations to said first virtual volume on a new layer.

18. The system, as claimed in claim 1, wherein a first management server is capable of proposing a change to the number of storage servers in said storage server system, and at least a second management server is capable of evaluating the change and providing a vote indicating approval or disapproval of the change.

19. The system, as claimed in claim 18, wherein when evaluating the change, said second management server determines if the change would adversely affect the ability to implement one or more certain storage functions.

20. The system, as claimed in claim 19, wherein one of the storage functions is replication of data between a storage server and another storage server.

21. The system, as claimed in claim 1, wherein said storage servers are distributed across a network and are operable to provide shared read and write access to other components on the network.

* * * * *